United States Patent
Assarpour

(10) Patent No.: US 9,164,771 B2
(45) Date of Patent: Oct. 20, 2015

(54) METHOD FOR THREAD REDUCTION IN A MULTI-THREAD PACKET PROCESSOR

(75) Inventor: Hamid Assarpour, Arlington, MA (US)

(73) Assignee: AVAYA INC., Basking Ridge, NJ (US)

( * ) Notice: Subject to any disclaimer, the term of this patent is extended or adjusted under 35 U.S.C. 154(b) by 695 days.

(21) Appl. No.: 13/539,223

(22) Filed: Jun. 29, 2012

(65) Prior Publication Data

US 2014/0006757 A1 Jan. 2, 2014

(51) Int. Cl.
  *G06F 9/38* (2006.01)
  *G06F 9/46* (2006.01)
  *G06F 9/30* (2006.01)

(52) U.S. Cl.
  CPC .............. *G06F 9/38* (2013.01); *G06F 9/30076* (2013.01); *G06F 9/46* (2013.01)

(58) Field of Classification Search
  CPC .............. G06F 9/30072; G06F 9/3017; G06F 9/30181; G06F 9/30094; G06F 9/30145
  See application file for complete search history.

(56) References Cited

U.S. PATENT DOCUMENTS

| | | | | |
|---|---|---|---|---|
| 5,193,167 A | * | 3/1993 | Sites et al. | 711/163 |
| 5,293,620 A | * | 3/1994 | Barabash et al. | 718/102 |
| 6,260,135 B1 | * | 7/2001 | Yoshida | 712/214 |
| 2004/0098720 A1 | * | 5/2004 | Hooper | 718/102 |
| 2011/0149966 A1 | * | 6/2011 | Pope et al. | 370/392 |

* cited by examiner

*Primary Examiner* — Farley Abad
(74) *Attorney, Agent, or Firm* — Anderson Gorecki & Rouille LLP

(57) ABSTRACT

Key lookup operations are broken into two instructions: a Key Dispatch Instruction (KDI), and a Return Result Instruction (RRI). The thread uses KDI to dispatch key information to a selected coprocessor to initiate a key lookup operation. Upon dispatch of the key value to the coprocessor, the KDI is retired to enable the thread to continue to dispatch and retire addition instructions in the pipeline and does not go idle. Subsequently, the thread will issue a RRI to obtain the key lookup result from the coprocessor. While a thread is executing, it maintains, as part of its context, a busy flag per coprocessor in a scoreboard register and a return result register per coprocessor. KDI causes the corresponding busy flag in the scoreboard register to be set. When the key lookup operation is complete, the busy flag is cleared and the result is stored in the return result register.

18 Claims, 3 Drawing Sheets

METHOD FOR THREAD REDUCTION IN A MULTI-THREAD PACKET PROCESSOR

CROSS-REFERENCE TO RELATED APPLICATIONS

None.

BACKGROUND

1. Field

This application relates to communication networks and, more particularly, to a method for thread reduction in a multi-thread packet processor.

2. Description of the Related Art

Data communication networks may include various switches, nodes, routers, and other devices coupled to and configured to pass data to one another. These devices will be referred to herein as "network elements". Data is communicated through the data communication network by passing protocol data units, such as frames, packets, cells, or segments, between the network elements by utilizing one or more communication links. A particular protocol data unit may be handled by multiple network elements and cross multiple communication links as it travels between its source and its destination over the network.

When a packet is received by a network element, the network element will process the packet and forward the packet on to its destination. To accelerate packet processing, a multi-thread packet processor may be used in which an execution pipeline is used to processes packets and each packet is assigned to a thread. Each thread processes a packet and has its own dedicated context, such as a program counter, link registers, address registers, data registers, local memories, etc. To increase performance, two or more execution pipelines may be used to process packets in parallel.

A programmable/microcodeable fine-grained multi-threaded packet processor may be viewed as a single physical execution pipeline shared among multiple threads. Packet processors of this class do not implement any bypass pipeline stages, thus eliminating pipeline hazards such as resource conflicts, branch delays, pipeline stalls, etc. This means, however, that when a thread dispatches an instruction from the execution pipeline, it must retire that instruction before it dispatches the next instruction into the pipeline. If an instruction requires multiple cycles, the thread will go idle until the instruction has been retired. To accelerate particular operations and minimize the amount of idle time each thread spends waiting for particular instructions to be retired the multi-threaded packet processor may incorporate dedicated hardware accelerators. For example, the multi-threaded packet processor may include hardware accelerators for key lookup operations, such as to perform MAC address lookup operations, IP address lookup operations, and implement n-tuple filters.

In a pipeline processor of this nature, not all stages of the pipeline take the same amount of time. For example, a memory lookup operation (e.g. key lookup operation) may take many cycles to return a value. Indeed, one challenge with key lookup operations is the numerous memory accesses that are needed to perform that particular operation. This leads to large latencies due to memory accesses. One way to hide the coprocessor latency associated with implementing key lookup operations is to hide the latency by increasing the number of threads per execution pipeline. Unfortunately, since each thread is heavy on context, increasing the number of threads leads to more logic and larger design implementations.

The minimum number of threads needed to completely hide coprocessor latency and still maintain full instruction dispatch rate into the execution pipeline without any empty pipe stages (no bubbles) may be calculated as $T \geq n + m \ast \Sigma c_i$, where T is the minimum number of threads required to fill the pipeline, n is the number of pipe states in the main execution pipeline, m is the number of key lookup coprocessors, and $c_i$ is the number of pipe stages including the total memory accesses per coprocessor. For example, assume that a pipeline has 20 stages, and that one of the stages takes a coprocessor 10 cycles to complete. To fully fill the pipeline, such that one packet is being output from the pipeline during every cycle, it would be necessary to use 30 threads to fully fill the pipeline.

Increasing the number of threads has a further impact on the amount of time it takes to process any given packet (latency). Specifically, if a thread goes idle for a number of cycles while a coprocessor is executing a lookup, this idle time increases the amount of time it takes to process the packet and, accordingly, increases the latency experienced by the packet in the network element. Accordingly, it would be advantageous to reduce the number of threads required to fill a packet processing pipeline of a multi-thread packet processor.

SUMMARY OF THE DISCLOSURE

The following Summary, and the Abstract set forth at the end of this application, are provided herein to introduce some concepts discussed in the Detailed Description below. The Summary and Abstract sections are not comprehensive and are not intended to delineate the scope of protectable subject matter which is set forth by the claims presented below.

Key lookup operations are broken into two instructions: a key dispatch instruction, and a return result instruction. While a thread is executing, it maintains, as part of its context, a busy flag per coprocessor in a scoreboard register and a return result register per coprocessor. The thread dispatches the key to the selected coprocessor using a key dispatch instruction to initiate a key lookup operation. This action causes the corresponding busy flag in the scoreboard register to be set. Upon dispatch of the key value to the coprocessor, the KDI is retired to enable the thread to continue to dispatch and retire addition instructions in the pipeline. The thread thus continues to execute instructions in the execution pipeline while the key lookup operation is on-going and does not go idle. At a later point in the pipeline, the thread will issue a return result instruction to the coprocessor. This causes the thread to check the corresponding busy flag for the coprocessor. If the busy flag is cleared, the lookup result will be read from the return result register. If the busy flag is set, the thread becomes idle until the busy flag is cleared.

BRIEF DESCRIPTION OF THE DRAWINGS

Aspects of the present invention are pointed out with particularity in the claims. The following drawings disclose one or more embodiments for purposes of illustration only and are not intended to limit the scope of the invention. In the following drawings, like references indicate similar elements. For purposes of clarity, not every element may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
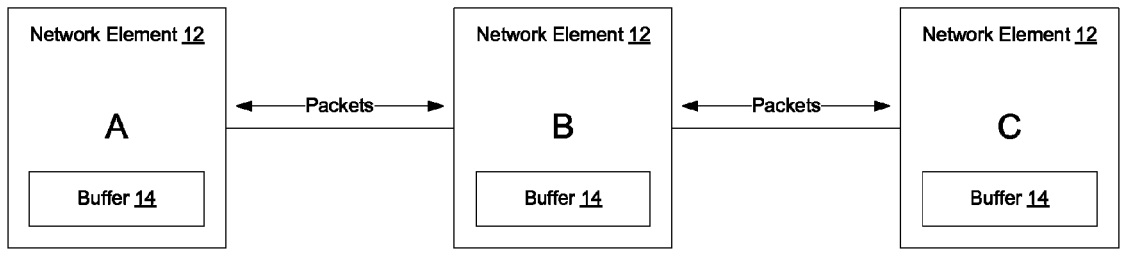
FIG. 1 is a functional block diagram of an example network.

FIG. 1 illustrates an example of a network 10 in which a plurality of switches 12 are interconnected to transmit packets of data. As packets are received, they are placed in buffers 14 to be stored while they are processed, and then forwarded toward their destination on the network.

Figure 2:
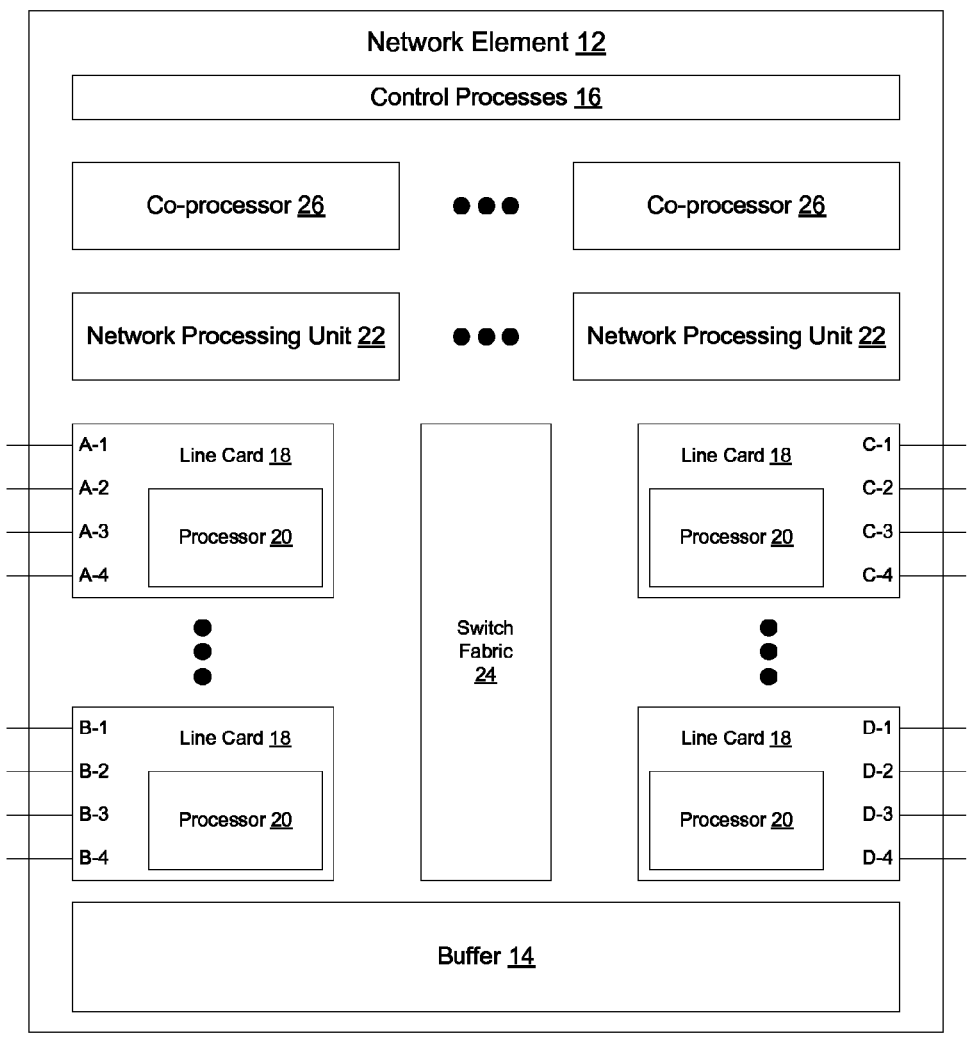
FIG. 2 is a functional block diagram of an example network element.

FIG. 2 shows an example network element 12 which may be used to implement an embodiment. The processes described herein for handling packets may be implemented in multiple types of network elements and the process described herein is not limited to the example shown in FIG. 2. Rather, FIG. 2 is merely intended to provide one example of how a network element may be configured to implement the functions described in greater detail below. The network element of FIG. 2 may be used as an edge network element such as an edge router, a core network element such as a router/switch, or as another type of network element. The network element of FIG. 2 may be implemented on a communication network utilizing one of the Ethernet 802.1 standards, such as 802.1ad, 803.2ah, 802.1Qay, 802.1aq, or other routed Ethernet standard. The network element of FIG. 2 may also be used in other types of wired/wireless communication networks in which a network element using a multi-threaded packet processor may be used to perform packet processing.

As shown in FIG. 2, the network element 12 includes one or more control processes 16 to control operation of the network element. Example control processes may include routing processes, network operation administration and management software, an interface creation/management process, and other processes. The particular manner in which the network element is being controlled is not particularly important to understanding operation of the network element on the network and, accordingly, has not been treated in excessive detail herein.

The control processes 16 program hardware forming a data plane of the network element to enable the network element to handle the rapid transmission of packets of data. The data plane, in the illustrated embodiment, includes ports connected to physical media to receive and transmit data. The physical media may include fiber optic cables or electrical wires. Alternatively, the physical media may be implemented as a wireless communication channel, for example using one of the cellular, 802.11 or 802.16 wireless communication standards. In the illustrated example, ports are supported on line cards 18 to facilitate easy port replacement, although other ways of implementing the ports may be used as well.

The line cards 18 have processing capabilities such as a microprocessor 20 or other hardware configured to format the packets, perform pre-classification of the packets, etc. The data plane further includes one or more Network Processing Unit (NPU) 22 and a switch fabric 24. The NPU and switch fabric enable data to be switched between ports to allow the network element to forward network traffic toward its destination on the network.

In one embodiment, each network processing unit 22 implements one or more physical execution pipelines, each of which are shared among multiple threads. Each thread has its own dedicated context such as program counter, link registers, address registers, data registers, local memory, etc., and is used to manage processing of a single packet. Multi-threaded packet processors are well known in the art and, accordingly, well known implementation details have not been included herein to avoid obfuscation of the salient portions of the disclosure. Coprocessors 26 are provided to enable particular aspects of packet processing to be implemented using dedicated hardware.

According to an embodiment, packet processing is implemented by decomposing a key lookup operation into two instructions—a Key Dispatch Instruction (KDI) and a Return Result Instruction (RRI). The thread execution is described in greater detail below in connection with FIGS. 3 and 4. Both the KDI and RRI are designed to enable one-way communication of information between the NPU and coprocessors such that, upon transmission of information in the one direction, the KDI and RRI instructions may be retired to allow continued execution of other instructions in the packet processing pipeline.

As discussed in greater detail below, the thread, as part of its context, maintains a busy flag per coprocessor in a scoreboard register and implements a return result register per coprocessor. The thread dispatches the key to the selected coprocessor using a key dispatch instruction. This action causes the corresponding busy flag in the scoreboard register to be set, and causes the coprocessor to begin executing on a key lookup operation. After dispatch, the KDI is retired to enable the thread to continue to execute by issuing instructions to the execution pipeline. Thus, dispatching the key to the selected coprocessor does not cause the thread to go idle.

At a later point in time, the thread will issue a return result instruction (RRI) to the coprocessor. This causes the thread to check the corresponding busy flag for that coprocessor in the scoreboard register. If the busy flag is cleared (the busy flag is cleared by the coprocessor when it finishes and returns the results back to the return result register) than the thread will continue with instruction execution. If the busy flag is set, then the thread becomes idle until the busy flag is cleared. The proposed solution thus overlaps the key lookup operation with thread pipeline execution, thus not requiring additional threads to cover the lookup operation latency. The number of threads that are needed is T=n, where n is the number of pipe stages in the main execution pipeline. By removing all or a portion of the coprocessor delay, the number of threads required to fill the pipeline may be reduced thus decreasing the complexity of the processor design and reducing latency associated with packet processing.

Figure 3:
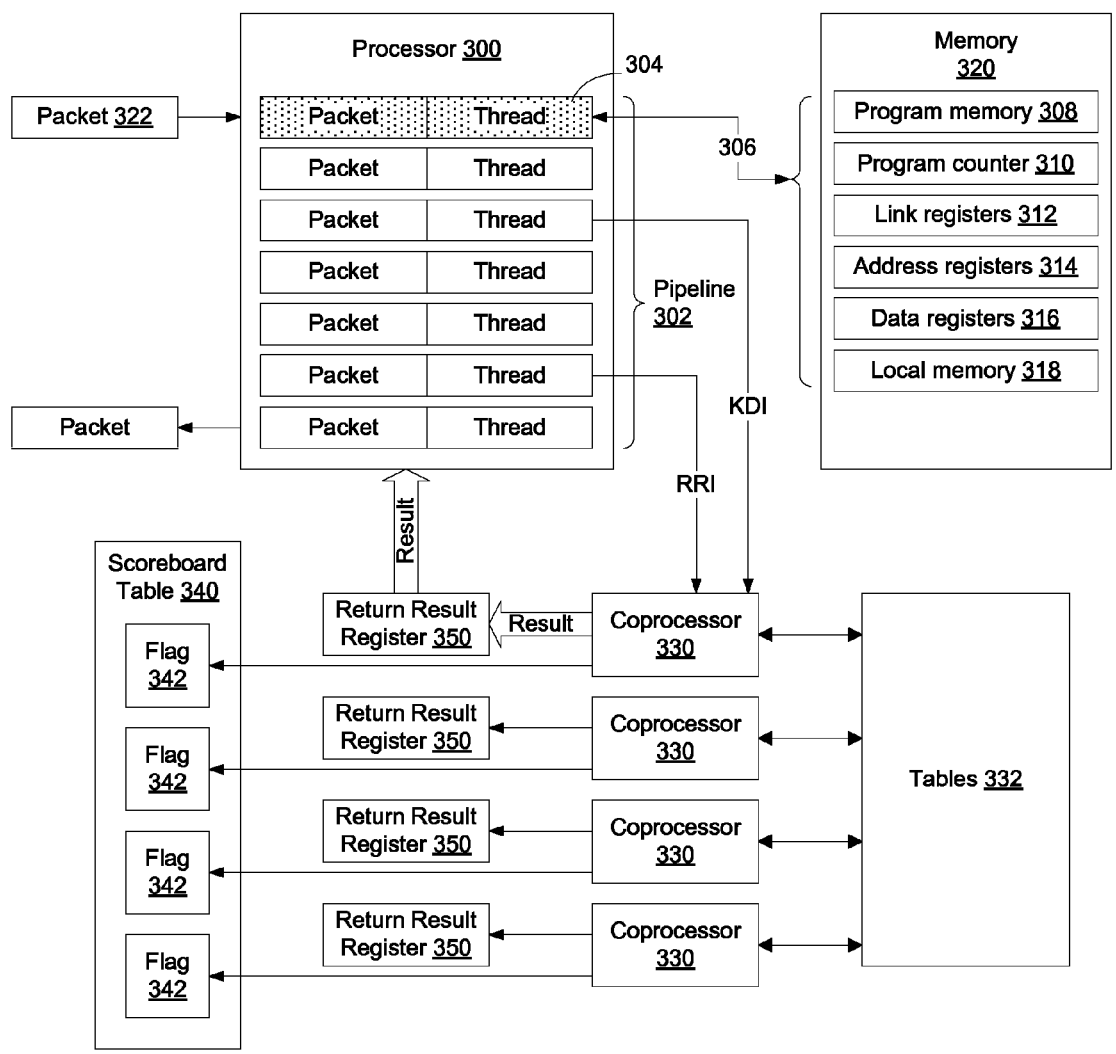
FIG. 3 is a functional block diagram showing a processing environment of an example network element according to an embodiment.

FIG. 3 shows an example processing environment according to an embodiment. As shown in FIG. 3, the processing environment includes one or more processors 300 and one or more coprocessors 330. The coprocessors are configured to perform a specific task, such as to perform a key lookup operation in tables 332 or to perform another processing intensive task such as encryption/decryption or data compression. For example, the coprocessor may be used to perform an a key lookup operation such as to look up a MAC address, IP address, or n-tuple filter. Lookup operations of these types are typically based on values of a plurality of fields of a header of a packet, although other lookup operations may be implemented as well depending on the services to be applied to the packet. Lookup operations of this nature are commonplace in packet processing.

The processor 300 in the illustrated processing environment is a multi-threaded packet processor having a single physical execution pipeline 302 shared among multiple threads 304. The processor 300 does not implement any bypass pipeline stages thus eliminating pipeline hazards, resource conflicts, branch delays, pipeline stalls etc. A network element such as the network element illustrated in FIG. 2 may include multiple such execution pipelines implemented in one or more NPU cores 22. Each thread 304 has its own dedicated context 306 such as program/instruction memory 308, program counter 310, link registers 312, address registers 314, data registers 316, and allocated local memory 318. The context may be stored in memory 320 or in other accessible computer readable storage medium available in the processing environment.

As packets 322 are received, they are assigned to a next available thread and inserted into the pipeline. The pipeline implements processing stages to process the packets. Once a thread dispatches an instruction into the execution pipeline, it must retire that instruction before it dispatches the next instruction into the pipeline. To fully fill the pipeline, the minimum number of threads will depend on the number of execution cycles required to process each packet. Although the example shows a pipeline with seven threads, it may be expected that a much larger number of threads would be required to fill a typical execution pipeline.

As shown in FIG. 3, one or more stages of the pipeline may include a Key Dispatch Instruction (KDI). A KDI is in an instruction to the pipeline to obtain a key, such as a plurality of values from the header of the packet, and to pass the key from the processor to a coprocessor 330. Once the key has been dispatched, the KDI instruction will be retired to enable the thread to continue to execute subsequent instructions within the execution pipeline. The thread does not go into idle, since the KDI instruction is fully complete upon dispatch of the key value to the coprocessor with instructions to the coprocessor to implement a key lookup operation in the tables 332 using the value passed in the KDI instruction. Further, the KDI does not constitute a prohibited bypass, branch, etc., since the KDI is fully executed and retired prior to dispatch by the thread of a subsequent instruction to the processing pipeline.

According to an embodiment, the thread, as part of its context, maintains a busy flag 342 per coprocessor in a scoreboard register 340 and also maintains a return result register 350 per coprocessor. The scoreboard table 340 and return result register 350 may be implemented in memory 320 or in other accessible computer readable storage medium available in the processing environment. The scoreboard register indicates to the thread whether a coprocessor is occupied with a key lookup operation and the return result register provides a location for the coprocessor to store a result of the key lookup operation that is accessible to the thread.

The thread dispatches the key to the selected coprocessor using the KDI instruction. This action causes the corresponding busy flag 342 in the scoreboard register to be set. The coprocessor will execute the key lookup operation and, upon completion, will return the results to the return result register 350. When the coprocessor has returned the results of the key lookup operation to the return result register 350, the coprocessor will clear the corresponding busy flag 342 to indicate that it has completed processing of the KDI.

At a later point in the pipeline, for example when the result of the key lookup operation is required by other instructions to be executed in the thread, the thread will issue a new instruction referred to herein as a Return Result Instruction (RRI). The Return Result Instruction causes the thread to check the corresponding busy flag for that coprocessor. If the busy flag is cleared, the thread recognizes that the coprocessor has completed processing of the KDI and will obtain the result from the return result register 350. If the busy flag remains set, the thread will become idle until the busy flag is cleared.

Using an instruction in the thread pipeline that dispatches key lookup information to the coprocessor, without requiring an immediate result from the coprocessor, enables the coprocessor to implement at least a portion of the key lookup or other processing intensive task in parallel with execution of other instructions in the packet processing pipeline. At a later point in the thread, when the result of the earlier dispatched instruction is required, the thread will issue a separate independent instruction to read the result of the previously dispatched key lookup instruction.

Figure 4:
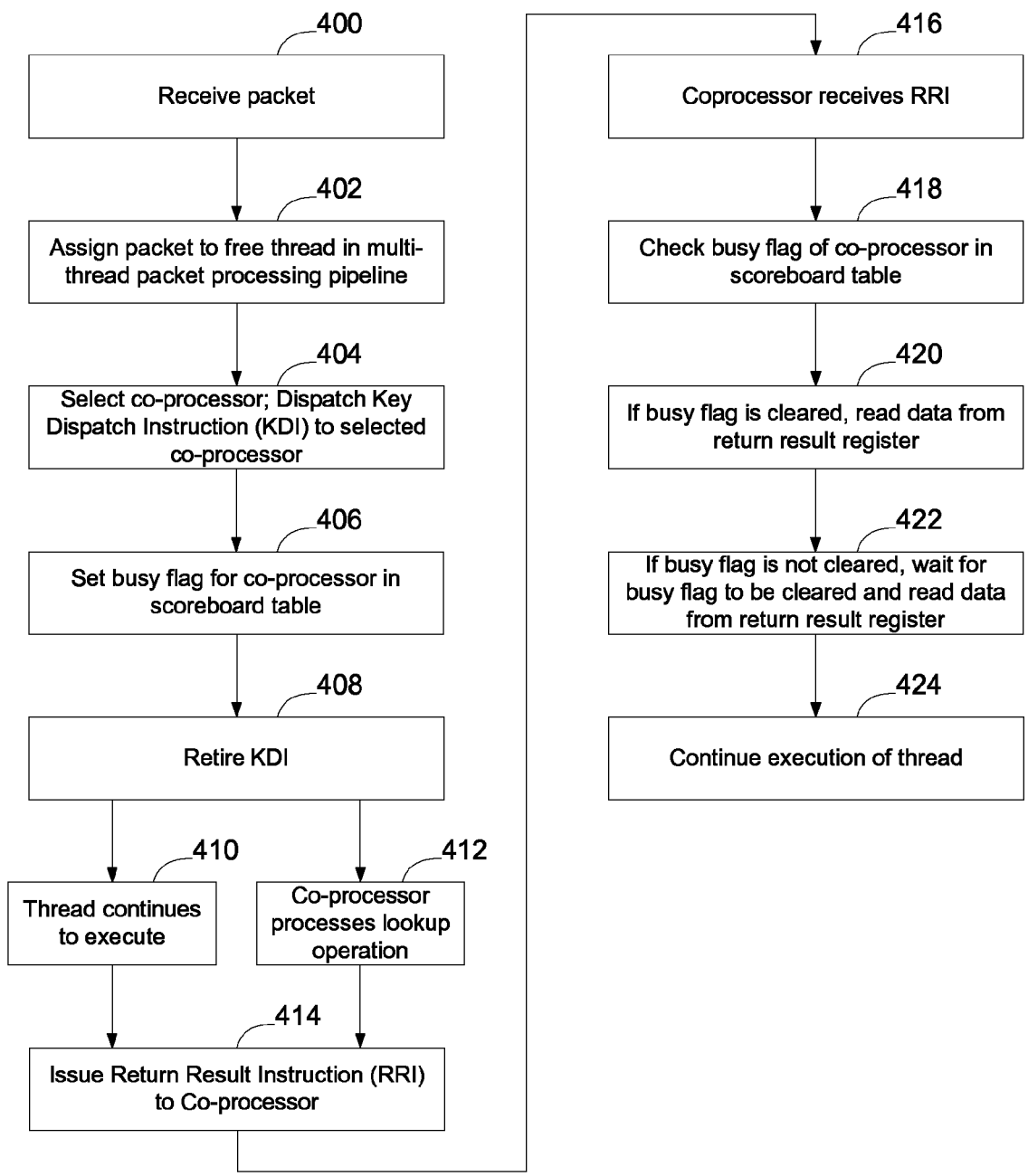
FIG. 4 is a flow diagram of a process for thread reduction in a multi-thread packet processor according to an embodiment.

FIG. 4 shows an example process according to an embodiment. As shown in FIG. 4, when a packet is received (400) the packet will be assigned to the next available free thread in the multi-threaded packet processor (402). The multi-threaded packet processor will execute the packet processing stages of the packet processing pipeline as the thread serially dispatches instructions for execution to the processor.

At one point in the pipeline, the thread will dispatch information to a coprocessor to enable the coprocessor to implement packet lookup operation in parallel with execution of other instructions in the packet processing pipeline by the thread. Dispatching information to the coprocessor does not cause the thread to implement bypass since stages of the processing pipeline are not being bypassed in connection with dispatching information to the coprocessor. Accordingly, the dispatch instruction does not cause pipeline hazards, resource conflicts, branch delays, pipeline stalls, etc. Rather, the dispatch instruction enables the thread to communicate information to the coprocessor and is fully executed upon selecting a coprocessor and dispatching a key dispatch instruction to the selected coprocessor (404). When the key dispatch instruction is issued to the coprocessor, a busy flag for the coprocessor will be set in the scoreboard table as part of the thread's context (406).

As shown in FIG. 4, the key dispatch instruction is fully executed by the thread in connection with dispatching the key information to the coprocessor. Accordingly, once the key dispatch instruction has been issued, the KDI will be retired (408), the thread will continue to execute subsequent stages of the pipeline by issuing further instructions to the coprocessor (410). The thread implements these steps prior to obtaining a result from a key lookup operation from the coprocessor. Rather, the continued execution of the thread proceeds in parallel with the coprocessor's execution of the key lookup operation (412).

At a later point in time, after the thread has executed one or more intervening instructions, the thread will issue a return result instruction to the coprocessor (414). When the return result instruction is received (416) the busy flag of the coprocessor in the scoreboard table will be checked (418) to determine whether the coprocessor has completed processing the key lookup operation. If the busy flag is cleared, the thread will read the result of the key lookup operation from the return result register (420). If the busy flag has not been cleared, the thread will wait for the busy flag to be cleared and then read data from the return result register (422). Upon receipt of the result from the coprocessor, the thread will continue to execute subsequent instructions in the packet processing pipeline (424).

Although an implementation has been described in which assignment of a lookup task to a coprocessor was assigned to execute in parallel with the main processing thread, other tasks may be assigned as well such as encryption/decryption, compression, and other tasks which use dedicated hardware such as a coprocessor to implement a packet processing stage of the processing pipeline.

The functions described herein may be embodied as a software program implemented in control logic on a processor on the network element or may be configured as a FPGA or other processing unit on the network element. The control logic in this embodiment may be implemented as a set of program instructions that are stored in a computer readable memory within the network element and executed on a microprocessor on the network element. However, in this embodiment as with the previous embodiments, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, or any other device including any combination thereof. Programmable logic can be fixed temporarily or permanently in a tangible non-transitory computer-readable medium such as a random access memory, cache memory, read-only memory chip, a computer memory, a disk, or other storage medium. All such embodiments are intended to fall within the scope of the present invention.

It should be understood that various changes and modifications of the embodiments shown in the drawings and described herein may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of thread reduction in a multi-thread packet processor, the method comprising the steps of:
    executing, by a thread in a multi-thread packet processor, a first plurality of stages of a packet processing pipeline;
    dispatching, by the thread, a key dispatch instruction to a coprocessor to cause the coprocessor to initiate a key lookup operation;
    executing, by the thread, a second plurality of stages of the packet processing pipeline;
    issuing, by the thread, a return result instruction to obtain a result of the key lookup operation from the coprocessor;
    wherein the step of executing the second plurality of stages occurs after the step of dispatching the key dispatch instruction and prior to the step of issuing the return result instruction.

2. The method of claim 1, further comprising the steps of receiving a packet and assigning the packet to a free thread in the multi-thread packet processor.

3. The method of claim 2, wherein each thread is assigned to a separate packet.

4. The method of claim 1, further comprising maintaining a busy flag for the coprocessor.

5. The method of claim 4, wherein the busy flag is set when the key dispatch instruction is dispatched to the coprocessor.

6. The method of claim 4, wherein the busy flag is cleared when the coprocessor completes execution of the key lookup operation.

7. The method of claim 6, wherein the return result instruction is not issued until the busy flag is cleared.

8. The method of claim 6, wherein the coprocessor stores the result of the key lookup operation in a return result register, and wherein the return result instruction causes the result of the key lookup operation to be read from the return result register.

9. The method of claim 1, wherein the step of executing, by the thread, the second plurality of stages of the packet processing pipeline occurs in parallel with implementation of the key lookup operation by the coprocessor.

10. A network element, comprising:
    a coprocessor; and
    a multi-thread packet processor, each thread configured to sequentially implement a plurality of stages of a packet processing pipeline, the plurality of stages including a first plurality of stages, a key dispatch instruction, a second plurality of stages, and a return result instruction, wherein:
        the key dispatch instruction is configured to cause the coprocessor to initiate a key lookup operation;
        the return result instruction is configured to obtain a result of the key lookup operation from the coprocessor; and
        the thread executes the second plurality of stages of the packet processing pipeline after implementing the key dispatch instruction to cause the coprocessor to implement the key lookup operation and prior to implementing the return result instruction to obtain the result of the key lookup operation from the coprocessor.

11. The network element of claim 10, wherein each thread of the multi-thread packet processor is assigned to a separate packet.

12. The network element of claim 10, further comprising multiple coprocessors and a scoreboard table maintaining a set of flags, each flag being associated with one of the coprocessors.

13. The network element of claim 12, wherein a busy flag for a respective one of the coprocessors is set in the scoreboard table when the key dispatch instruction is implemented to cause the respective one of the coprocessors to implement the key lookup operation.

14. The network element of claim 13, wherein the busy flag for the respective one of the coprocessors is cleared in the scoreboard table when the respective one of the coprocessors completes execution of the key lookup operation.

15. The network element of claim 14, wherein the return result instruction is not issued until the busy flag is cleared.

16. The network element of claim 14, further comprising a set of return result registers, each of the result registers being associated with a corresponding one of the plurality of coprocessors.

17. The network element of claim 14, wherein the respective coprocessor stores the result of the key lookup operation in its associated return result register, and wherein the return result instruction causes the result of the key lookup operation to be read from the return result register of the respective coprocessor.

18. The network element of claim 10, wherein the network element is configured such that execution of the second plurality of stages of the packet processing pipeline occurs in parallel with implementation of the key lookup operation by the coprocessor.

* * * * *